United States Patent
Gerlach (10) Patent No.: US 7,636,334 B2
(45) Date of Patent: *Dec. 22, 2009

(54) METHOD FOR INTER-CELL INTERFERENCE COORDINATION WITH POWER PLANNING FOR OFDM MOBILE COMMUNICATION SYSTEM

(75) Inventor: Christian Georg Gerlach, Ditzingen (DE)

(73) Assignee: ALCATEL, Paris (FR)

( * ) Notice: Subject to any disclaimer, the term of this patent is extended or adjusted under 35 U.S.C. 154(b) by 526 days.

This patent is subject to a terminal disclaimer.

(21) Appl. No.: 11/109,750

(22) Filed: Apr. 20, 2005

(65) Prior Publication Data

US 2005/0265222 A1 Dec. 1, 2005

(30) Foreign Application Priority Data

May 4, 2004 (EP) .................................. 04291152

(51) Int. Cl.
*H04W 4/00* (2006.01)
(52) U.S. Cl. .................. 370/330; 370/280; 370/281
(58) Field of Classification Search .................. 370/203, 370/208, 338, 400, 401, 331, 328–334
See application file for complete search history.

(56) References Cited

U.S. PATENT DOCUMENTS

| | | | | |
|---|---|---|---|---|
| 6,038,450 A * | 3/2000 | Brink et al. | ................. | 455/442 |
| 6,259,685 B1 * | 7/2001 | Rinne et al. | ................. | 370/330 |
| 6,456,847 B1 | 9/2002 | Lilja et al. | | |
| 6,996,418 B2 * | 2/2006 | Teo et al. | ................. | 455/562.1 |
| 7,133,354 B2 * | 11/2006 | Laroia et al. | ................. | 370/208 |
| 2002/0004920 A1 * | 1/2002 | Cho et al. | ................... | 714/704 |
| 2002/0086708 A1 * | 7/2002 | Teo et al. | .................... | 455/561 |
| 2002/0102941 A1 | 8/2002 | Kuiri et al. | | |
| 2002/0147017 A1 | 10/2002 | Li et al. | | |

(Continued)

FOREIGN PATENT DOCUMENTS

EP 0 902 551 A2 3/1999

(Continued)

OTHER PUBLICATIONS

U.S. Appl. No. 11/109,751, filed Apr. 20, 2005, entitled "Methods for Terminal Assisted Coordinated Radio Serving and Interference Avoidance in OFDM Mobile Communication System".

(Continued)

*Primary Examiner*—Ricky Ngo
*Assistant Examiner*—Ben H Liu
(74) *Attorney, Agent, or Firm*—Sughrue Mion, PLLC (57) ABSTRACT

A method for inter-cell interference coordination with power planning in a radio communication system employing multi-carrier techniques such as OFDM for the air interface communication between a network and a plurality of user terminals, the network comprising a plurality of base stations having means for communication with the user terminals located inside their cell service area, the cells arranged following an adjacent cell pattern, where neighbor cells do not have the same number and cells with the same number are separated by at least one cell in-between, for resource planning purposes, each cell having an inner cell region and a border cell region in which inter-cell interference is affecting the quality of service received by a user terminal.

9 Claims, 4 Drawing Sheets

U.S. PATENT DOCUMENTS

2003/0053519 A1* 3/2003 Gilhousen et al. .......... 375/141
2003/0123425 A1   7/2003 Walton et al.
2005/0265222 A1* 12/2005 Gerlach ...................... 370/208

FOREIGN PATENT DOCUMENTS

| GB | 2 358 326 A | 7/2001 |
|---|---|---|
| WO | WO 95/17048 A1 | 6/1995 |
| WO | WO 98/44754 A2 | 10/1998 |
| WO | WO 03/058906 A2 | 7/2003 |
| WO | WO 03/081938 A1 | 10/2003 |
| WO | WO 2004/019538 A2 | 3/2004 |

OTHER PUBLICATIONS

3GPP TSG RAN WGI #37 "OFDM with interference control for improved HSDPA coverage", Montreal, Canada May 10-14, 2004, pp. 1-11.

Christian Georg Gerlach:, "Methods for terminal assisted coordinated radio serving and interference avoidance in OFDM mobile communication system" filed Apr. 20, 2005.

3GPP TSG RAN WG1 #34 "Revised text proposal for OFDM User Traffic Multiplexing Solutions", Seoul, Korea, Oct. 6-10, 2003, pp. 1-3.

3GPP TSG-RAN-1 Meeting #32, "Benefits of Frequency Hopping for the OFDM DL" May 19-23, 2003, Marne La Vallee, France, pp. 1-4.

* cited by examiner

METHOD FOR INTER-CELL INTERFERENCE COORDINATION WITH POWER PLANNING FOR OFDM MOBILE COMMUNICATION SYSTEM

BACKGROUND OF THE INVENTION

The invention is based on a priority application EP 04291152.9 which is hereby incorporated by reference.

The present invention relates to wireless communications systems, and more particularly, to a method for minimizing inter-cell interference in digital radio cellular communication systems employing multi-carrier transmission techniques, such as orthogonal frequency division multiplexing (OFDM).

Communication systems employing many sub-carriers, such as those that employ OFDM technology are currently used for the transmission of high-speed digital radio and television signals, e.g. Digital Audio Broadcasting (DAB) and Digital Video Broadcasting Terrestrial transmission mode (DVB-T) systems. Also, OFDM has become a widely accepted standard high bit rate transmission technique for the realization of wide-band air interfaces for wireless access to current local area networks (LAN), e.g. HiperLAN and IEEE WLAN systems. And, in the same way, the $3^{rd}$ Generation Partnership Project (3GPP), for the standardization of high-speed broadband wireless mobile communication systems, is recently considering the application of OFDM techniques for the high speed data packet access (HSDPA) air interface communication between the radio access network (RAN) and the user equipment (UE).

Since OFDM is a multi-carrier transmission technique, the available spectrum is divided into many sub-carriers, each being modulated by data at a relatively low data rate. OFDM supports multiple access by allocating different sub-carriers to different users. The sub-carriers for OFDM are orthogonal and closely spaced to provide an efficient spectrum usage. Each narrow band sub-carrier is modulated using various modulation formats, such as quadrature phase-shift keying (QPSK) and quadrature amplitude modulation (QAM).

Due to the increasing popularity of high-speed broadband wireless mobile communication, of particular interest are wireless communication systems comprising bandwidth-efficient multiple access schemes. Wireless systems are shared media systems, that is, there is a fixed available bandwidth that must be shared among all the users of the system, so it is desired that radio access systems be as efficient as possible to maximize the number of users that can be served and the data rates at which the service is provided.

Typical radio access networks are implemented as so-called "cellular" systems which comprise a plurality of base stations controlled by a radio network controller (RNC), the base stations communicating with a plurality of user mobile terminals which are located inside their cell service area. It is also well known in the art that such cellular wireless systems may present particular intra- and/or inter-cell interference problems which limit the capacity of the system, the intra-cell interference being the interference experienced by one user that is caused by other users communicating within the same cell, and the inter-cell interference defined as the interference experienced by one user that is caused by other users communicating in cells other than the one in which the user is located.

In the prior art, narrow band time division multiple access (TDMA) systems, such as group special mobile (GSM), neighboring base stations use different, non-overlapping parts of the available bandwidth. However, in order to avoid substantial interference between them base stations that are sufficiently far away from each other, i.e., non-neighboring base stations, may use the same parts of the available bandwidth. Notwithstanding such frequency "re-use", the bandwidth available for use in each cell is a small part of the total available spectrum. As a result, the system has a low "spectral" efficiency.

In the prior art, in code division multiple access (CDMA) systems, although the entire bandwidth is used by each base station which means a frequency "re-use of one", the downlink communication in each base station cell suffers from a small number of other neighbor high-power base stations, thus limiting the capacity of the access system. This becomes particularly serious at the boundary region of a cell where the transmitting base station and an interfering base station are equidistant from the intended user. This situation is relieved by "soft handover", where two or more base stations transmit to the user simultaneously. This soft handover mechanism though is not available for the recently standardized HSDPA service using a fast automatic repeat request (ARQ) mechanism, since ARQ is efficient only if just one base station is involved.

For OFDM, as in the CDMA case, we also consider a network deployment based on a frequency re-use scheme of one, that is, all frequencies or OFDM subcarriers, in the 5 MHz channel bandwidth, are used in every cell. In such a frequency re-use of one cellular network, the adjacent base stations also generate strong interference particularly for users at the edge of the cell coverage. Therefore, depending on the traffic loading of the surrounding cells, a basic frequency "reuse-one" OFDM network deployment may result, similar to the CDMA case, in a relatively poor quality of service and potentially low data rates for users at the cell edges.

To improve the distribution of data rate across the entire cell in OFDM access systems and to evenly distribute the interference to all users, particularly for cell edge users, some inter-cell interference mitigation techniques have been proposed. In the document "Benefits of Frequency Hopping for the OFDM DL", 3GPP TSG-RAN1Meeting #32, R1-030523, Marne La Vallee, France, 19-23 May 2003, a solution is proposed in which the main idea is to interleave differently the transmitted subcarriers in each OFDM symbol over some or all of the channel bandwidth, prior to transmission. This variable frequency interleaving is done by simply assigning each cell (or sector) a unique hopping sequence, i.e., a distinct frequency interleaver sequence. Thus, in the case of partial frequency loading the interference is mitigated. The neighboring cells can use different frequency groups to avoid inter-cell interference. Another solution proposed to reduce inter-cell interference is described in document "Revised text proposal for OFDM Traffic Multiplexing Solutions", 3GPP TSG RAN1 #34, R1-030970, Seoul, Korea, 6-10 Oct. 2003, which is based on special time frequency mapping patterns that simultaneously achieve large diversity gains and small cross-interference in the case of asynchronous interfering transmissions and partial frequency load.

SUMMARY OF THE INVENTION

It is the object of the invention to provide a new method for inter-cell interference coordination using power planning in order to improve the quality of service particularly for users receiving service at cell border in a mobile communication system using OFDM transmission technology.

The object is achieved, according to an exemplary embodiment of the invention, by a method for inter-cell interference coordination with power planning in a radio communication system employing multi-carrier techniques such as OFDM for the air interface communication between a network and a plurality of user terminals, the network comprising a plurality of base stations having means for communication with the user terminals located inside their cell service area, the cells arranged following an adjacent cell pattern, where neighbor cells do not have the same number and cells with the same number are separated by at least one cell in-between, for resource planning purposes, each cell having an inner cell region and a border cell region in which inter-cell interference is affecting the quality of service received by a user terminal; the OFDM wireless communication channel designed so that a terminal can receive at least two pilot channels in parallel, one for each cell service area interfering at the border cell region; the OFDM time-frequency grid partitioned in a number of orthogonal, non-overlapping time-frequency patterns, and said time-frequency patterns grouped in a number of disjunctive subsets or time-frequency groups, the number of disjunctive subsets corresponding to the number of different cells from the cell pattern for resource planning; in each cell, all time-frequency groups are used for communication with the terminals, but emission within a determined time-frequency group corresponding to the cell number is done with reduced power limited to a certain power value which is smaller than a maximum power available for transmission within the time-frequency groups; when a terminal moves from an inner cell region of a serving cell to the border cell region of said cell and in the direction of a neighbor cell, it measures pilot signals from the interfering neighbor cells in that region and reports to the mobile radio network information about the strength of reception from these cell pilot signals; based on the terminal information as a network criteria, the mobile radio network assigns to the terminal time-frequency patterns of the time-frequency group with which said neighbor cell emits with limited power.

It is also achieved by a mobile radio network comprising means for partitioning an OFDM time-frequency grid in a number of orthogonal, non-overlapping time-frequency patterns, and grouping them in a number of disjunct subsets or time-frequency groups, where a time-frequency group contains at least one of said time-frequency patterns, and assigning a user terminal one or more of said time-frequency patterns for communication; means for transmitting inside a cell using all time-frequency groups and for limiting the power of emission for one of said groups in each cell; means for receiving signaling information from a terminal about strength of reception measurements on cell pilot signals in a border cell region and means for analyzing said information and for assigning to the terminal a time-frequency group with which an interfering cell emits with reduced power limited by a certain power value;

a network element comprising means for receiving information about a determined cell pattern and/or OFDM time-frequency grid arrangement in a number of disjunct subsets or time-frequency groups, where a time-frequency group contains at least one time-frequency pattern; means for assigning a user terminal one or more of said time-frequency patterns for communication; means for transmitting inside a cell using all time-frequency groups and for limiting the power of emission for one of said groups in each cell; means for receiving signaling information from a terminal about strength of reception measurements on cell pilot signals in a border cell region and means for analyzing said information and for assigning to the terminal a time-frequency group with which an interfering cell emits with reduced power limited by a certain power value;

and a user terminal comprising means for receiving at least two OFDM pilot channels in parallel, means for negotiating one or more time frequency patterns from time-frequency groups with a mobile radio network communication; means for measuring the OFDM pilot signals from interfering neighbor cells in a border cell region and for reporting said information to the mobile radio network.

Advantageous configurations of the invention emerge from the dependent claims, the following description and the drawings. For example, it is seen advantageous that, by using the proposed invention, a more efficient use of the radio resources is done, specially for terminals located in the cell border region. Also advantageous is that the frequency usage in the inner circle area of the cell is unaffected. The invention further improves both the quality of service experienced by the user and the coverage of the base station service across the entire cell area. By using the proposed invention, the cell traffic throughput can be increased. Another advantage is that, fast automated repeat request (ARQ) mechanisms can be used for the full coverage area of the cell, i.e. also for terminals at the cell border.

BRIEF DESCRIPTION OF THE DRAWINGS

An embodiment example of the invention is now explained with the aid of FIGS. 1 to 5.

FIG. 3A, B, C shows exemplary partitionings of the OFDM time-frequency grid in time-frequency groups according to the invention FIG. 4A, B shows a method for inter-cell interference coordination using power planning according to the invention.

DETAILED DESCRIPTION OF THE DRAWINGS

Figure 1:
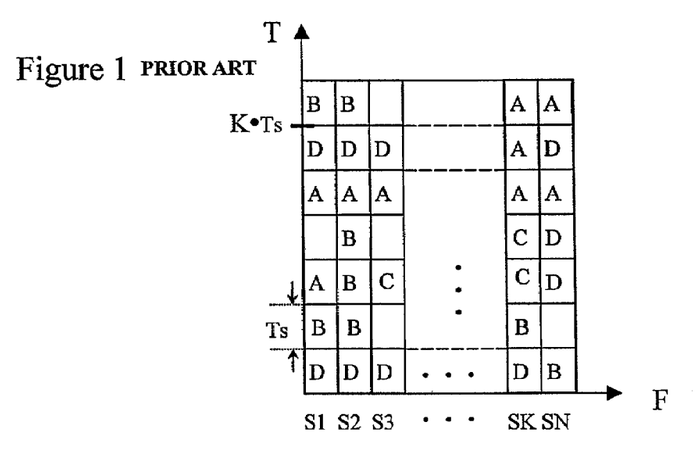
FIG. 1 shows an example of conventional subcarrier mapping to user channels into an OFDM time-frequency grid.

FIG. 1 shows an exemplary allocation of subcarriers S1 to SN to four user channels A, B, C and D in the OFDM time-frequency (T-F) grid.

OFDM offers the possibility to flexibly allocate one or more subcarriers S1 to SN to one user or one logical channel A, B, C or D to control the data rate for this user channel. Since this can change also over time in a TDMA system (e.g. with a change period of K symbol periods Ts e.g. a period of 2 ms), we have a 2-dimensional resource allocation grid, hereinafter referred as T-F grid, as indicated in FIG. 1.

Some of the time-frequency grid locations may not be available for data transmission, because they are used for carrying pilot or signaling information. User assignment of remaining locations can be done based on frequency or time or a combination of both.

Figure 2:
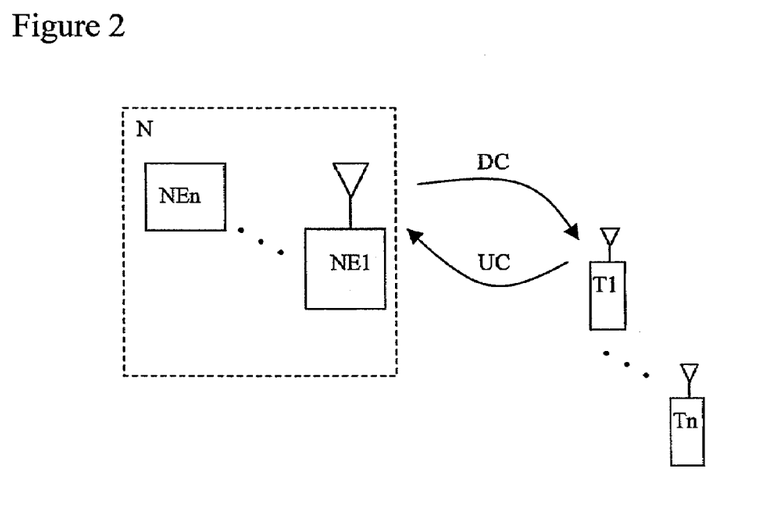
FIG. 2 illustrates a block diagram of a conventional OFDM mobile communications system including the network and the user terminals.

FIG. 2 shows a block diagram of a mobile communications system in which a mobile radio network N, including a plurality of network elements NE1 to NEn, and a plurality of user terminals T1 to Tn exchange data information via an air interface downlink channel DC and an uplink channel UC using multi-carrier modulation schemes, at least in the downlink, such as OFDM. The network elements NE1 to NEn can be for example base stations, radio network controllers, core network switches, or any other communication elements which are generally used for wireless mobile communications.

Figure 3:
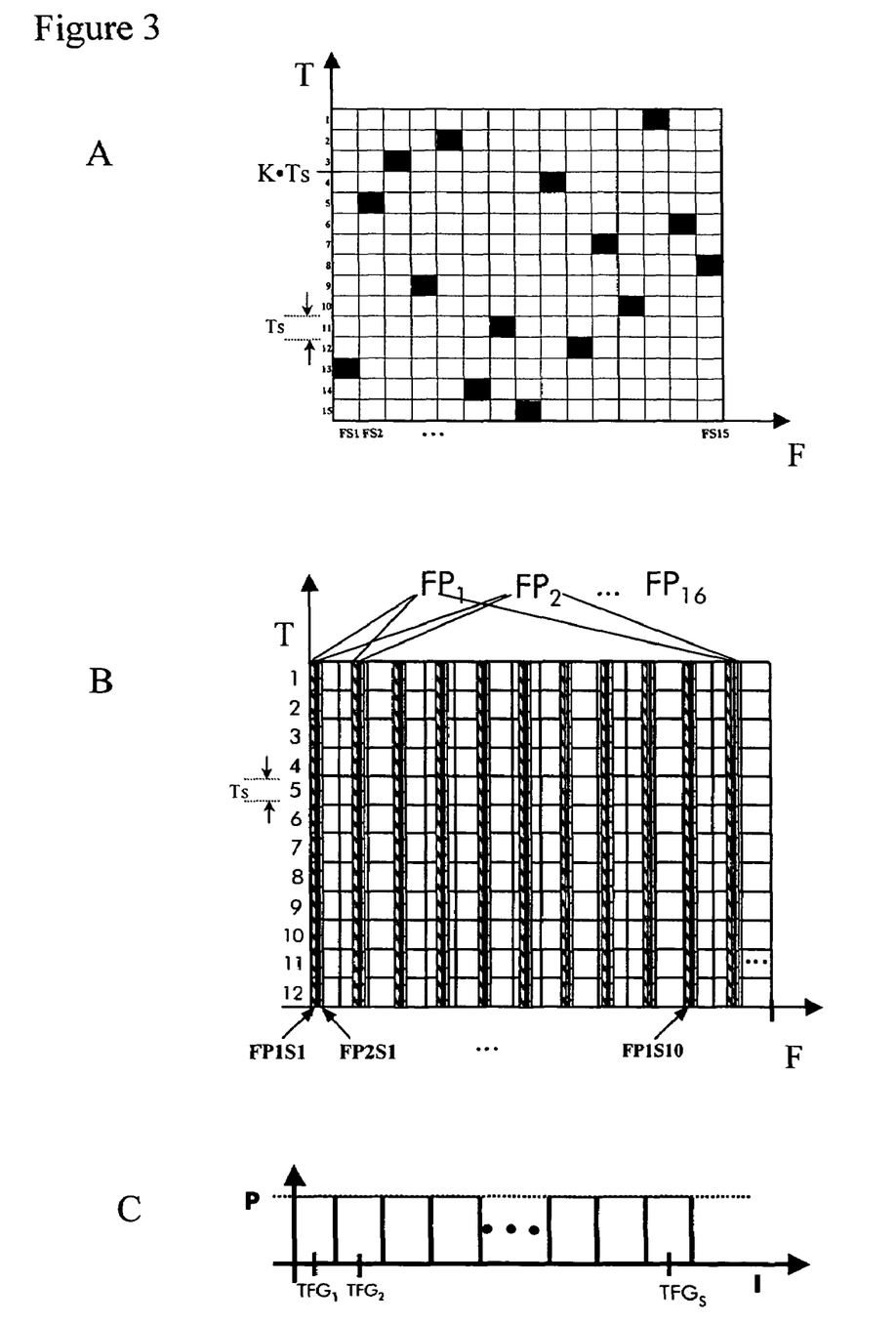

FIG. 3A, B, C shows two exemplary partitionings of the OFDM T-F grid in a number S of disjunct "subsets", hereinafter referred as "T-F groups" TFG1 to TFGS.

According to the invention, the OFDM T-F grid is partitioned in a number of orthogonal, non-overlapping T-F patterns, as shown in FIGS. 3A and 3B, and said T-F patterns are grouped in a number S of disjunct subsets or T-F groups TFG1 to TFG S, i.e., each T-F group TFG1 to TFGS comprising at least one T-F pattern, as shown in FIG. 3C. The partitioning of the OFDM T-F grid can be done by the mobile network N or can be introduced and configured by an operator in the mobile network N previous to communication.

FIG. 3A shows one out of 15 possible T-F patterns in which the OFDM T-F grid can be partitioned, consisting of 15 different sub-carrier frequency sub-bands FS1 to FS15, each sub-band having 40 sub-carriers, and in which the frequency sub-bands are changed over the time. One or more of such T-F patterns can be grouped then to form a T-F group.

FIG. 3B shows two out of 16 possible T-F patterns FP1 to FP16 in which the OFDM T-F grid can be partitioned, said T-F patterns allocating the same sub-carriers over the time T. Because of the constant allocation of the same sub-carriers over the time these T-F patterns will be hereinafter referred just as "frequency patterns".

The partitioning of the OFDM T-F grid so that the OFDM communication channel is designed in a way that at least two pilot channels can be received in parallel according to the invention will be hereinafter described by way of an example solution. For example, an OFDM system employing 704 sub-carriers, not considering the direct current(DC)-carrier, in a 5 MHz band and a number K=12 of OFDM symbols in a period Ts of 2 ms is looked at.

The pilot and signaling information can be placed every $12^{th}$ sub-carrier such as on the numbers 0, 12, 24, 36, 48, 60, 72 etc. up to 696. So, for example, every even OFDM symbol the sub-carriers 0, 24, 48, 72 etc. carry pilot information and the others 12, 36, 60, etc. signaling information while every odd OFDM symbol the sub-carriers 12, 36, 60, etc. carry pilot information and the others 0, 24, 48, etc. the signaling. In a neighboring cell, e.g. cell two C2, the pilot/signaling sub-carriers are shifted by one in the frequency direction such as 1, 13, 25, 37, 49, 61, 73, etc. up to 697. This configuration allows 12 shifts until the original locations are reached again. Thus 12 different interleaving non-overlapping pilot/signaling patterns are possible and can be distributed in an area so that neighboring cells never use the same pilot/signaling sub-carriers.

Figure 5:
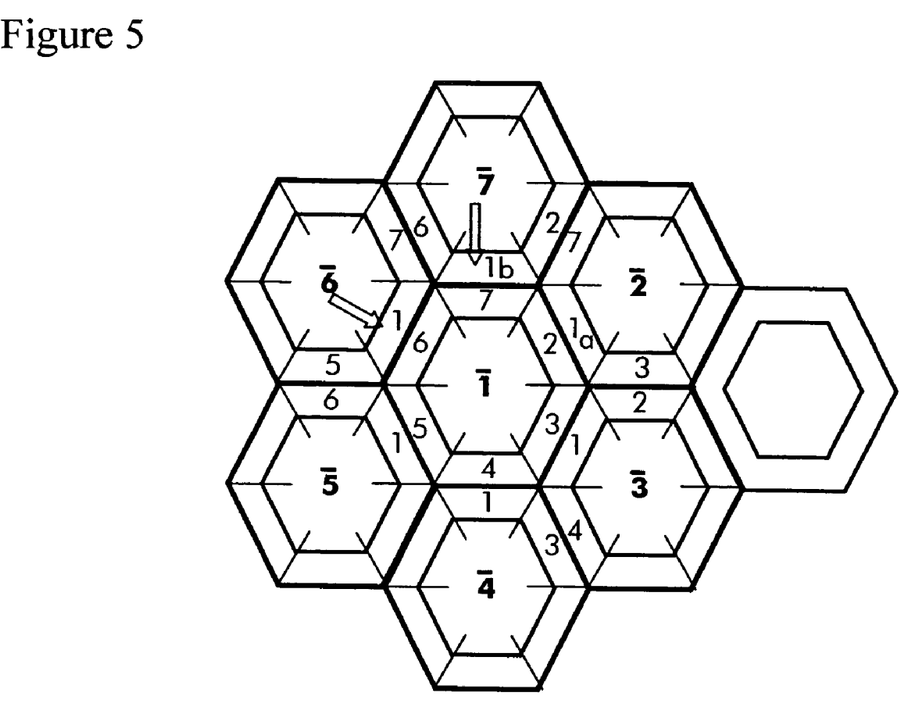
FIG. 5 illustrates the resource usage for terminals in the border region in a hexagonal cell pattern when the method for inter-cell coordination with power planning according to the invention is applied.

Since 16×44=704 then 16 frequency patterns FP1 to FP16 can be defined consisting of 44 sub-carriers each. The 44 sub-carriers can be placed, for example, in 11 frequency strips FPnS1 to FPnS11 spread across the frequency axis while each strip FPnSn contains 4 adjacent sub-carriers as indicated in FIG. 5. The distance between strips FPnSn of the same frequency pattern FPn is then 16×4=64 sub-carriers, so, for example, the first frequency pattern FP1 contains the sub-carriers 0 to 3 allocated in its first frequency strip FP1 S1, 64 to 67 allocated in its second frequency strip FP1 S2, 128 to 131 in the third frequency strip FP1S3, etc. According to the partition explained above, then each frequency pattern FP1 to FP16 contains at most 4 pilot or signaling sub-carriers in all its locations independent of the shift of the pilot pattern. So for data transmission there are always 40 of the 44 sub-carriers remaining in 12 OFDM symbols giving a total rate per each 2 ms block of 12×40=480 complex sub-carrier symbols (480 QAM symbols) usable for data transmission.

Each basic frequency pattern (FP1 to FP16) occupies the same locations in all cells independent of the cell specific pilot pattern and further contains sufficient place in each pattern to accommodate for the specific sending cell pilot positions leaving at least always the basic number of time-frequency locations for the basic channel data rate of 480 complex sub-carrier symbols of such a pattern, so a basic Frequency pattern gets no interference from the sending cell pilots and just interference from neighboring cells with different pilot pattern and only maximally as much as amounts to the overhead place of 4 sub-carriers×12 OFDM symbols left for sending pilot locations i.e. the difference between the total place of the Frequency pattern (44×12) and the basic number of time-frequency locations (40×12) for the basic channel data rate.

FIG. 3C is a simplified diagram showing the T-F groups TFG1 to TFGS arranged just in one dimension over a horizontal axis according to the T-F group indices I, and the vertical axis being the power P of transmission. For the sake of simplicity of representation of the figures, but without loss of detail as explained in FIGS. 3A and 3B, the T-F groups are hereinafter depicted as blocks.

As already mentioned above, one or more T-F patterns can be assigned to a T-F group, for example, relating to FIG. 3B, the frequency patterns one FP1, three FP3 and ten FP10 could be assigned to a T-F group one TFG1, the frequency patterns two FP2, six FP6, seven FP7 and twelve FP12 could be assigned to a T-F group two TFG2, and the rest of frequency patterns available FP4, FP5, FP8, FP9, FP11, FP13, FP14, FP15, FP16 could be assigned to a T-F group three TFG3. There are then three S=3 disjunct subsets or T-F groups TFG1 to TFG3, and one or more T-F patterns from said T-F groups TFG1 to TFG3 can be later assigned to a user terminal T for communication with the mobile radio network N.

Figure 4:
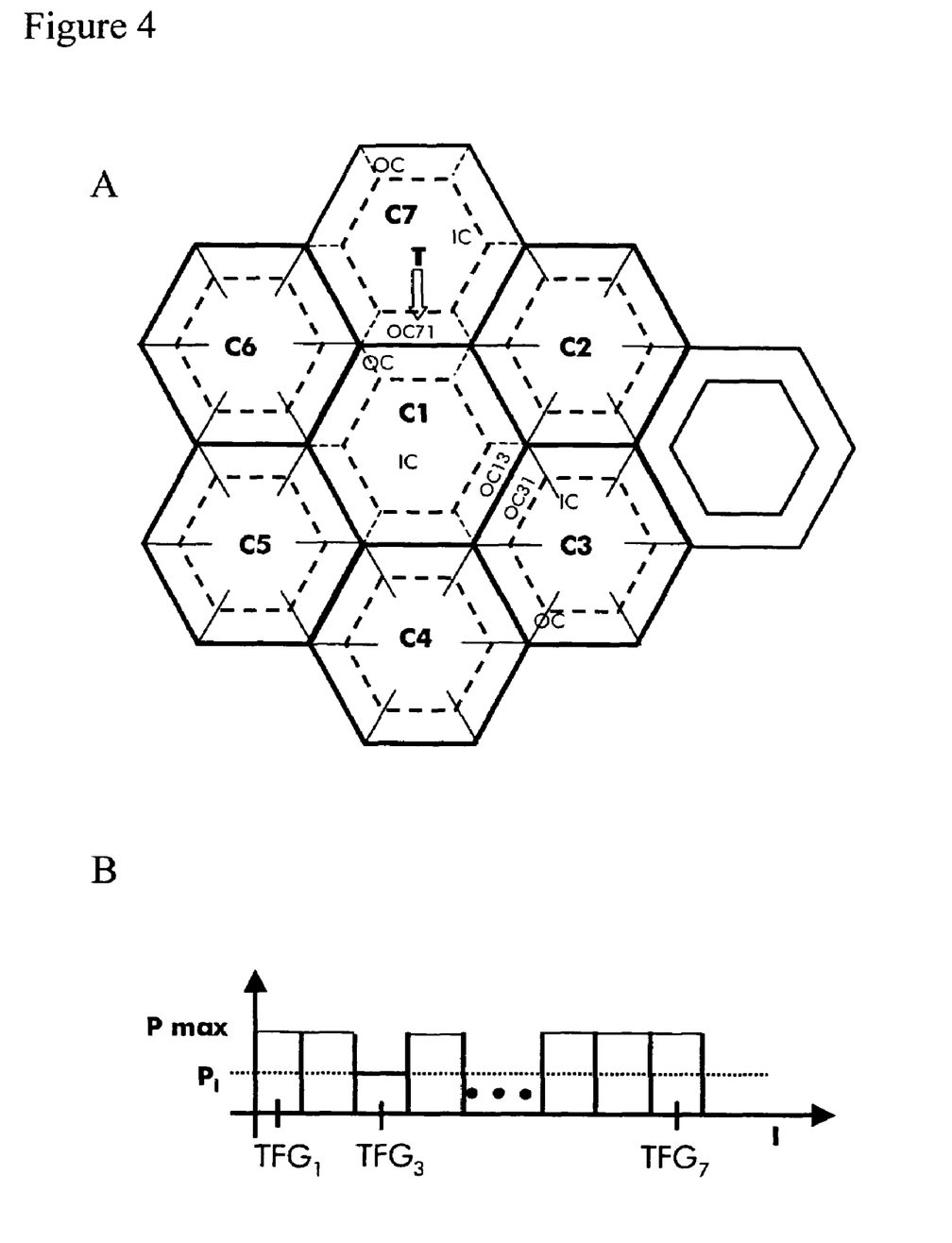

FIG. 4A, B illustrates a method for inter-cell interference coordination according to the invention. In FIG. 4A, an example of a cell planning scenario is shown in case the OFDM T-F grid is divided in seven T-F groups TFG1 to TFG7 according to the invention, while FIG. 4B shows an example of how power limitation is made in one of the cells C3 according to the invention.

As already mentioned above, the method comprises a resource planning procedure prior to communication in which the OFDM T-F grid or set of all T-F patterns is arranged in a number S of disjunct subsets named T-F groups.

The number of T-F subsets S can be, for example, seven S=7 or twelve S=12 to have some flexibility when the creation of new cells is needed in an area.

In FIG. 4A it is shown an exemplary cell planning scenario according to the invention in case the OFDM T-F grid is divided in seven T-F subsets TFG1 to TFG7. Although not shown in the example of the figure, it is assumed that a base station is located at the center of each cell and it relays the information signals to and from user terminals located within the cell. Each cellular region is denoted by a hexagonal cell C1 to C7, each having an inner cell region IC, i.e., an area near the base station where the inter-cell interference has attenuated enough so that it does not limit the capacity of the access system, and a border cell region OC, in which inter-cell interference is affecting the quality of service received by the user. Each base station is assigned a different number C1 to C7 before the cell numbers repeat again further away, as known from classical cell planning. Now a time-frequency group corresponding just to a cell undergoes special treatment according to the invention, i.e., it is emitted only with reduced power in that cell so that its power is smaller than a limit power value PI, said limit power value PI also being smaller than a maximum power Pmax with which the other T-F groups can be emitted in that cell. Specifically, in the example of FIG. 4A, in cell one C1, T-F group one TFG1 is emitted with reduced power while in the cell C1 the other T-F groups TFG2 to TFG7 can be emitted with maximum power Pmax; in cell two C2, T-F group two TFG2 is power restricted while the other T-F groups TFG1 and TFG3 to TFG7 can be emitted with full power; and so on successively so that in cell seven C7 the T-F group seven TFG7 is emitted with reduced power and the other T-F groups TFG1 to TFG6 can be emitted with full power.

The cell pattern shown in FIG. 4A, in which a first cell C1 has six adjacent cells C2 to C7 may be repeated in order to cover a wider service area.

The invention is based on the fact that the resource situation in the inner circle of a cell IC is not much limited by the signal-to-interference ratio (SIR) but by the bandwidth, and outside the inner circle, particularly in the boundary region of a cell OC, the capacity is more limited by the inter-cell interference situation. According to the invention then, the power at which a base station cell Cn transmits information to the user terminal using a determined T-F group TFGn is limited to a determined power value PI. This power value should be chosen with view to the situation at the cell border OC where the signal and interference is approximately equally attenuated. It should not be so high as to produce substantial inter-cell interference for a user terminal located in the border region OC of a neighbor cell using said T-F subset TFGn for communication with its origin base station. So it should guarantee an SIR to allow satisfying transmission. On the other hand, it should not be too low to also allow satisfying usage in the inner circle of the cell IC if possible.

This will be further explained in detail by way of the example of FIG. 4A. According to the invention the OFDM communication channel is designed so that terminals can receive at least two pilot channels in parallel. When the terminal T is served by, for example, a base station of cell seven C7 and moves from the inner circle IC to the cell border of said cell, in the direction of a neighbor cell, for example cell one OC71, it reports to the origin serving base station (of cell seven C7) which other base station is provoking the strongest interference, which in this case is the base station of cell one C1. The origin base station (of cell seven C7) then assigns the terminal T in that outer cell region OC71 one or more T-F patterns from T-F group one TFG1, which base station of cell one C1 is transmitting with reduced power, so that the signal-to-interference level experienced by the terminal T disturbed from base station of cell one C1 stays above a certain level and a useful transmission can be kept up.

Further, more generally, we could say that originating at a cell Cn, if a terminal approaches the border region OCni in direction to another cell, say Ci, it gets allocated one or more T-F patterns from the T-F group TFGi which in this other cell Ci is emitted with limited power. Prior to communication then, a network resource planning is made so that each base station is assigned a different frequency group TFG1 to TFG7, which they emit with limited power and each base station has knowledge of all the planned frequency groups TFG1 to TFG7 in order to transmit information inside the inner circle of the cell IC and assign the terminals the suitable T-F group when it approaches the border region OC and reports the interference from a specific cell number. This procedure is done before handover takes place.

The principle could also be further enhanced regarding the cell corners (where three cells meet) if the T-F groups e.g. TFG1 are further split in subsets e.g. two subsets TFG1a and TFG1b with different power usage, above a limit power value PI, dependent on the cell number.

With the proposed soft network planning all frequencies are unaffected in the inner circle. Restrictions by network planning only takes place in the border regions where the availability of the frequencies is only slightly, e.g. 6/7 or 6/12, reduced.

FIG. 4B shows an example of how power emission is done in cell three C3 for each T-F group TFG1 to TFG7 according to the teachings of the invention. The T-F group three TFG3 is emitted with reduced power smaller than a limit power value PI compared to a maximum emission power Pmax that can be used for communication with the other T-F groups TFG1, TFG2 and TFG4 to TFG7 in that cell C3.

The ratio Pmax/PI should guarantee an SIR allowing satisfying transmission with T-F group three TFG3 when used by a terminal approaching from a neighboring cell, into the border region in direction to cell three OC13.

In order to average interference for user terminals in neighboring cells that are not using coordination in the inner cell region IC, in a preferred embodiment of the invention the time-frequency pattern or time-frequency group assignments to these terminals are periodically changed, e.g. every change period of a number K of OFDM symbols, in a random or pseudo random manner. This shapes the produced inter-cell interference more evenly over all time frequency patterns.

Further, an important advantage of the method for inter-cell interference coordination with power planning method according to the invention is that it allows the origin base station cell alone to schedule the packets for the terminal for the full coverage area of the cell. Since no other base station besides the origin base station is involved in the transmission of data packets to the terminal, this allows that efficient fast automated repeat request (ARQ) mechanisms such as hybrid automated repeat request (HARQ), which allows the receiver to inform the transmitter that certain packets were either not received or corrupted, can be used for retransmission of said corrupted packets from the origin base station to the terminal.

FIG. 5 illustrates the resource usage for terminals in the border region in a hexagonal cell pattern with a cell repetition factor of seven, when the method for inter-cell coordination with power planning according to the invention is applied. If one assumes isotropic propagation in a plane area and marks the strips from the other cells also with the allocated frequency block numbers, one can see in FIG. 5 that all frequencies 1 to 7 are evenly used over the area with full symmetry giving a full resource usage (for evenly distributed terminals). So an evenly resource usage is achieved with the method according to the invention. This shows also that the availability of T-F pattern resources for this solution is already 6/7 in the border region of the cell which is quite high.

For the sake of generalization, it shall be understood, that although for the explanation of the present invention an OFDM modulation scheme has been used, the above proposals can in principle as well be adapted to any multi-carrier modulation scheme apart from OFDM.

Further, the invention is illustrated for a hexagonal cell situation with omni-directional antennas but can be generalized also for other patterns, and also for sectors within a cell.

It shall also be understood that means to carry out the methods herein described can be located anywhere in the mobile radio network N, that is, in a network element NE such as a base station or a radio network controller or by means of a radio resource manager entity, inside or outside the network elements NE. Said means being implemented in hardware or software form.

The invention claimed is:

1. A method for inter-cell interference coordination with power planning in a radio communication system employing Orthogonal Frequency Division Multiplexing (OFDM) for the air interface communication between a network and a plurality of user terminals, the network comprising a plurality of base stations having means for communication with the user terminals located inside their cell service area, the cells arranged following an adjacent cell pattern, wherein neighbor cells do not have the same number and cells with the same number are separated by at least one cell in-between, for resource planning purposes, each cell having an inner cell region and a border cell region in which inter-cell interference is affecting the quality of service received by a user terminal, the method comprising:

designating an OFDM wireless communication channel to a terminal so that the terminal can receive at least two pilot channels from at least two of the plurality of base stations in parallel, one for each cell service area interfering at the border cell region, partitioning an OFDM time-frequency grid in a number of orthogonal, non-overlapping time-frequency patterns, grouping the time-frequency patterns in a number of disjunctive subsets or time- frequency groups, the number of disjunctive subsets corresponding to the number of different cells from the cell pattern for resource planning, using in each cell all time-frequency groups for communication with the terminals, but emitting within a determined time-frequency group corresponding to the cell number with reduced power limited to a certain power value which is smaller than a maximum power available for transmission within all other time-frequency groups, measuring, by the terminal cell, pilot signals from the interfering neighbor cells and reporting to the mobile radio network information about the strength of reception from the cell pilot signals when the terminal moves from the inner cell region of a serving cell to the border cell region of the serving cell in the direction of a neighbor cell, and assigning, by the mobile radio network to the terminal, time-frequency patterns of the time-frequency group with which the neighbor cell emits with limited power based on the information reported by terminal to the mobile radio network.

2. The method for inter-cell interference coordination with power planning as claimed in claim 1, wherein the ratio between the maximum power available for transmission with the time-frequency groups and the limited power value for transmission within a determined time-frequency group in a cell guarantees an SIR allowing satisfying transmission with said power restricted time-frequency group when used by a terminal originating from a cell, and moving into the border region in direction of a neighboring cell.

3. The method for inter-cell interference coordination with power planning as claimed in claim 1, wherein the time-frequency groups are further split in disjunctive subsets with a different power limit above the limit power value used for power restriction of the time frequency groups, wherein the different power limit depends on the cell number, so as to deal with the interference at the cell corners of three cells.

4. The method for inter-cell interference coordination with power planning as claimed in claim 1, wherein the mobile radio network further uses an ARQ mechanism with the terminal to reschedule packets that were received in error when sent to the terminal.

5. The method for inter-cell interference coordination with power planning as claimed in claim 1, wherein the time-frequency pattern or time-frequency group assignments for the terminals in the inner cell region not using coordination are periodically changed in a random or pseudo random manner, so as to shape a caused inter-cell interference more evenly over the time-frequency pattern.

6. The method for coordinated interference avoidance as claimed in claim 1, wherein the base stations are not time synchronized.

7. The method for inter-cell interference coordination with power planning as claimed in claim 1, wherein the OFDM time-frequency grid is partitioned in a number of orthogonal, non-overlapping frequency patterns that use no frequency hopping.

8. The method for inter-cell interference coordination with power planning as claimed in claim 7, wherein the OFDM system pilot channels received by the terminal in different cells are designed in an interleaving non overlapping fashion with pilot symbols having higher energy as the data.

9. The method as claimed in claim 7, wherein each basic frequency pattern occupies the same locations in all cells independent from the cell specific pilot pattern and further contains sufficient place in each pattern to accommodate for the specific sending cell pilot positions leaving at least always the basic number of time-frequency locations for the basic channel data rate of such a pattern, so that a basic frequency pattern gets no interference from the sending cell pilots and just interference from neighboring cells with different pilot pattern and only maximally as much as amounts to the overhead place left for sending pilot locations, wherein the overhead place is determined as the difference between the total place of the frequency pattern and the basic number of time-frequency locations for the basic channel data rate.

* * * * *